(12) United States Patent  
Schlater et al.

(10) Patent No.: US 7,950,716 B2
(45) Date of Patent: May 31, 2011

(54) TRIM MOLDING FOR A MOTOR VEHICLE WINDOW PANEL

(75) Inventors: Timothy J. Schlater, Ludlow Falls, OH (US); Bradley M. Gross, Tipp City, OH (US); Marvin O. Reynolds, Troy, OH (US)

(73) Assignee: Creative Extruded Products, Inc., Tippy City, OH (US)

( * ) Notice: Subject to any disclaimer, the term of this patent is extended or adjusted under 35 U.S.C. 154(b) by 121 days.

(21) Appl. No.: 12/072,649

(22) Filed: Feb. 27, 2008

(65) Prior Publication Data

US 2009/0212588 A1 Aug. 27, 2009

(51) Int. Cl.
*B60J 10/02* (2006.01)

(52) U.S. Cl. ............ 296/93; 52/204.59; 52/208

(58) Field of Classification Search ......... 296/93, 296/96.21, 146.15, 201; 52/204.59, 208, 52/204.591; 277/630, 637, 644; 49/475.1, 49/496.1
See application file for complete search history.

(56) References Cited

U.S. PATENT DOCUMENTS

| | | | | | |
|---|---|---|---|---|---|
| 2,249,424 | A | * | 7/1941 | Hanington | 428/103 |
| 2,571,015 | A | * | 10/1951 | Columbus | 99/292 |
| 2,698,072 | A | * | 12/1954 | Beck | 52/204.597 |
| 3,908,312 | A | * | 9/1975 | Pennec | 49/493.1 |
| 4,370,832 | A | * | 2/1983 | Koike | 49/490.1 |
| 4,535,999 | A | * | 8/1985 | Locacius | 277/596 |
| 4,575,105 | A | * | 3/1986 | le Pierres | 277/637 |
| 4,833,847 | A | * | 5/1989 | Inayama et al. | 52/208 |
| 4,956,941 | A | * | 9/1990 | Vaughan | 49/440 |
| 5,038,521 | A | * | 8/1991 | Andrzejewski et al. | 49/441 |
| 5,039,157 | A | * | 8/1991 | Yada | 296/93 |
| 5,078,444 | A | * | 1/1992 | Shirahata et al. | 296/93 |
| 5,085,021 | A | * | 2/1992 | Kunert | |
| 5,149,168 | A | * | 9/1992 | Yada et al. | 296/201 |
| 5,170,587 | A | * | 12/1992 | Nakatani et al. | 49/490.1 |
| 5,316,829 | A | | 5/1994 | Cordes et al. | |
| 5,338,087 | A | | 8/1994 | Gross et al. | |
| 5,348,364 | A | * | 9/1994 | Yada | 296/93 |
| 5,389,423 | A | * | 2/1995 | Yada | 428/167 |
| 5,603,546 | A | * | 2/1997 | Desir, Sr. | 296/93 |
| 5,815,997 | A | * | 10/1998 | Cornils et al. | 52/208 |
| 5,864,996 | A | * | 2/1999 | Veldman et al. | 52/204.597 |
| 6,108,978 | A | * | 8/2000 | Jeong | 49/440 |
| 6,179,940 | B1 | * | 1/2001 | Escobar-Y-Gamboa et al. | 156/108 |
| 6,257,644 | B1 | * | 7/2001 | Young | 296/93 |
| 6,279,983 | B1 | * | 8/2001 | Biondo et al. | 296/93 |
| RE37,395 | E | * | 10/2001 | Kunert et al. | 52/745.15 |
| 6,382,696 | B1 | | 5/2002 | Young | |
| 6,487,823 | B2 | * | 12/2002 | Lagrue | 52/208 |
| 6,719,351 | B2 | * | 4/2004 | Cornils et al. | 296/93 |
| 6,979,041 | B2 | * | 12/2005 | May et al. | 296/93 |

(Continued)

*Primary Examiner* — Glenn Dayoan
*Assistant Examiner* — Pinel E Romain
(74) *Attorney, Agent, or Firm* — Jacox, Meckstroth & Jenkins

(57) ABSTRACT

A motor vehicle window panel has a peripheral trim molding formed by an extruded body of plastics material, and the body includes a mounting flange and a vehicle body sealing flange integrally connected by an intermediate connecting portion. The mounting flange carries a pressure sensitive contact adhesive tape which bonds to an inner surface of the window panel, and the intermediate connecting portion has an internal stabilizing strip and a durometer greater than the durometer of the mounting flange and of the sealing flange. The molding may be supported within a fixture for receiving the window panel or may carry a tear-off locating flange which slides against an edge surface of the window panel to locate the molding on the panel. The mounting flange may carry a spacer rib, and the mounting flange, sealing flange and connecting portion are located inwardly of the inner surface of the window panel.

5 Claims, 3 Drawing Sheets

U.S. PATENT DOCUMENTS

| | | | |
|---|---|---|---|
| 7,000,356 B2 * | 2/2006 | Tamai et al. | 52/99 |
| 7,059,656 B2 * | 6/2006 | Mikkaichi et al. | 296/146.15 |
| 7,188,885 B2 | 3/2007 | Schlater et al. | |
| 2006/0022487 A1 * | 2/2006 | Schlater et al. | 296/146.15 |

* cited by examiner

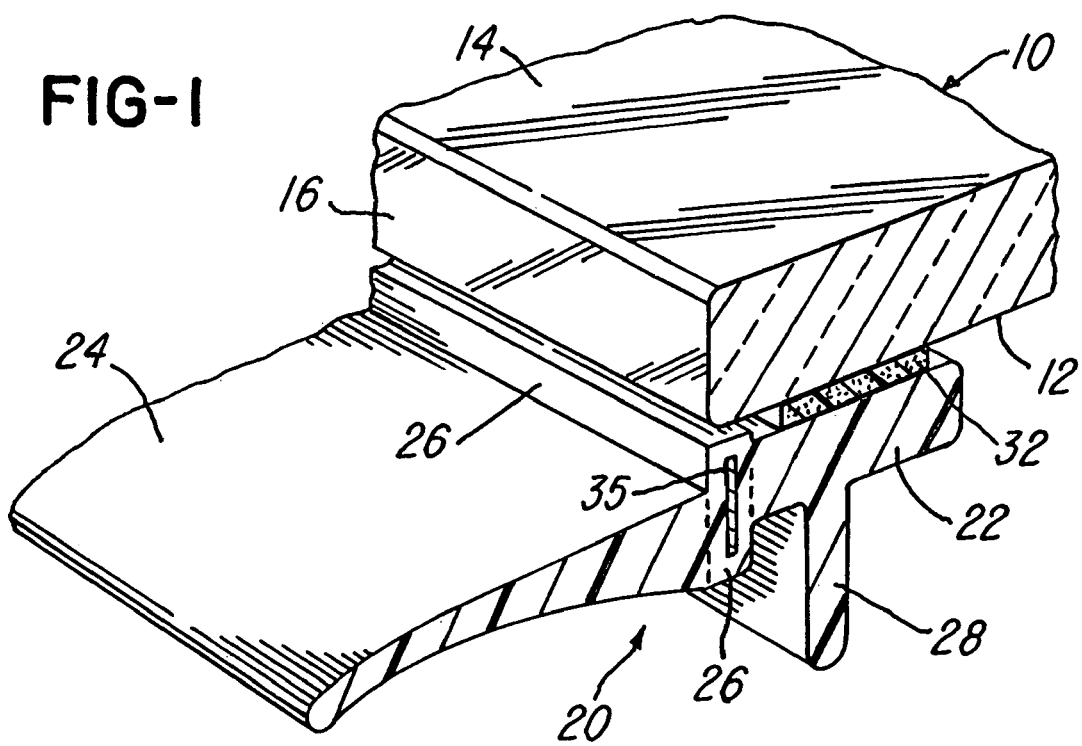
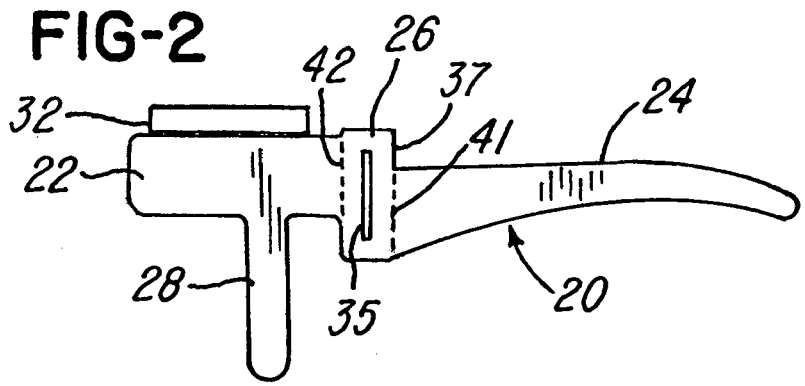
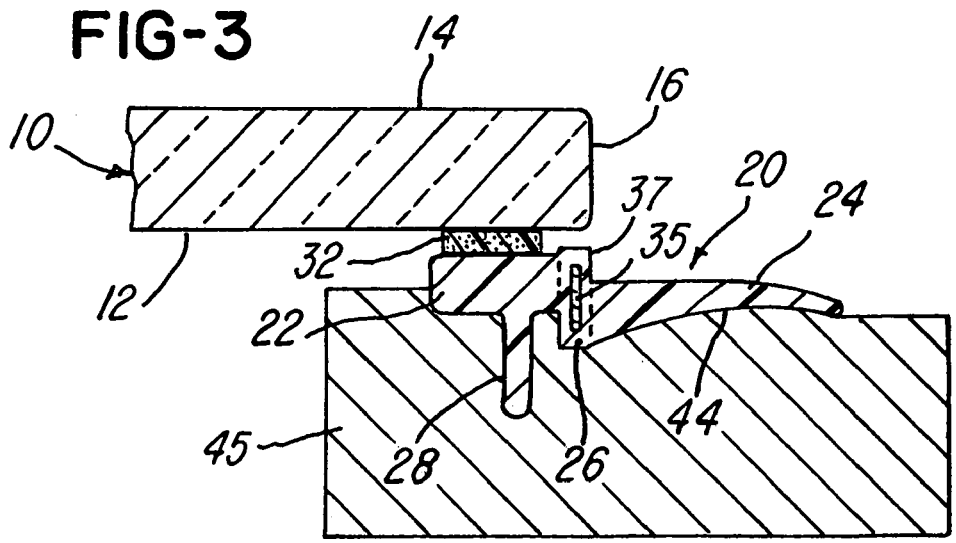

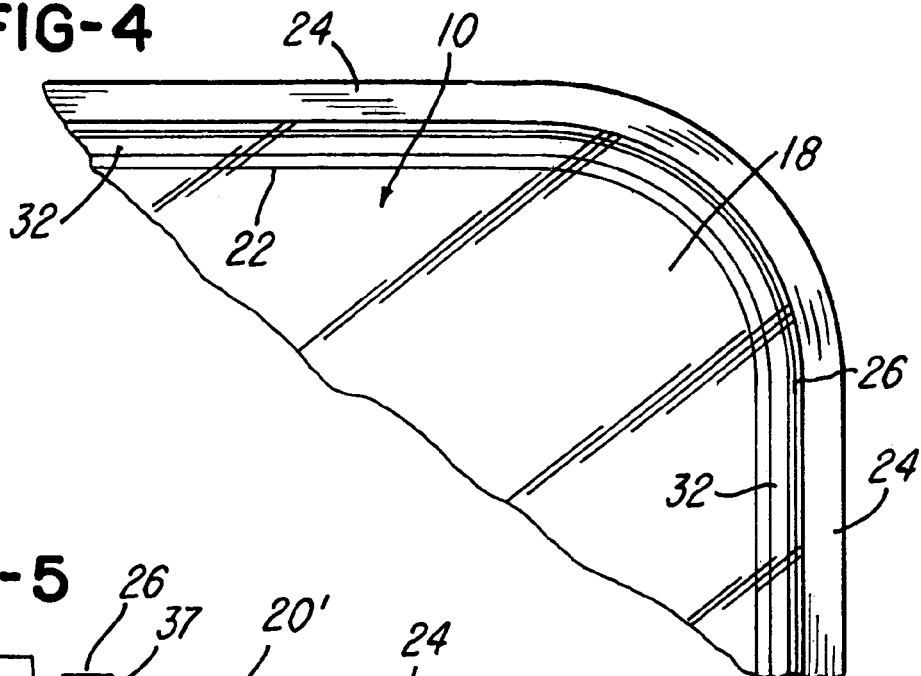
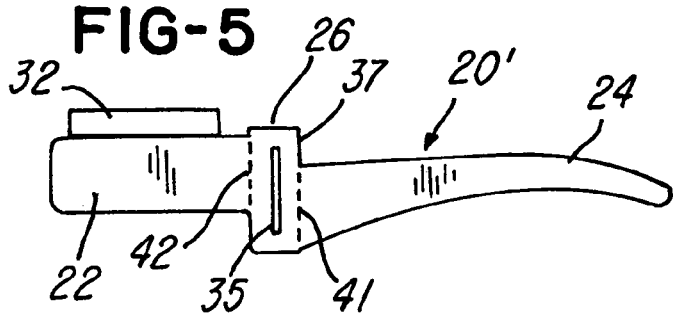
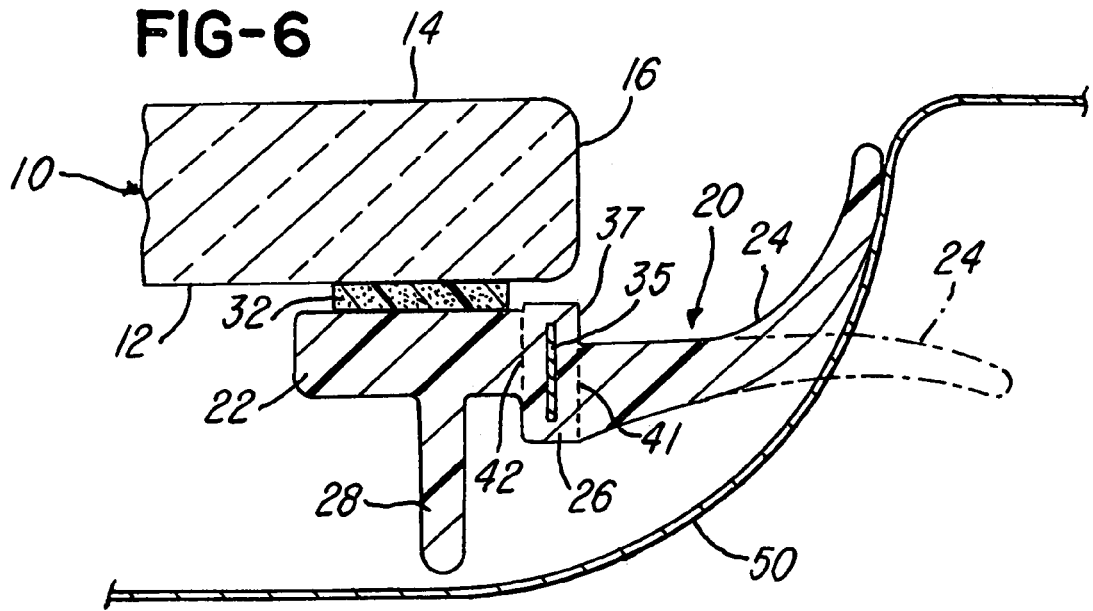

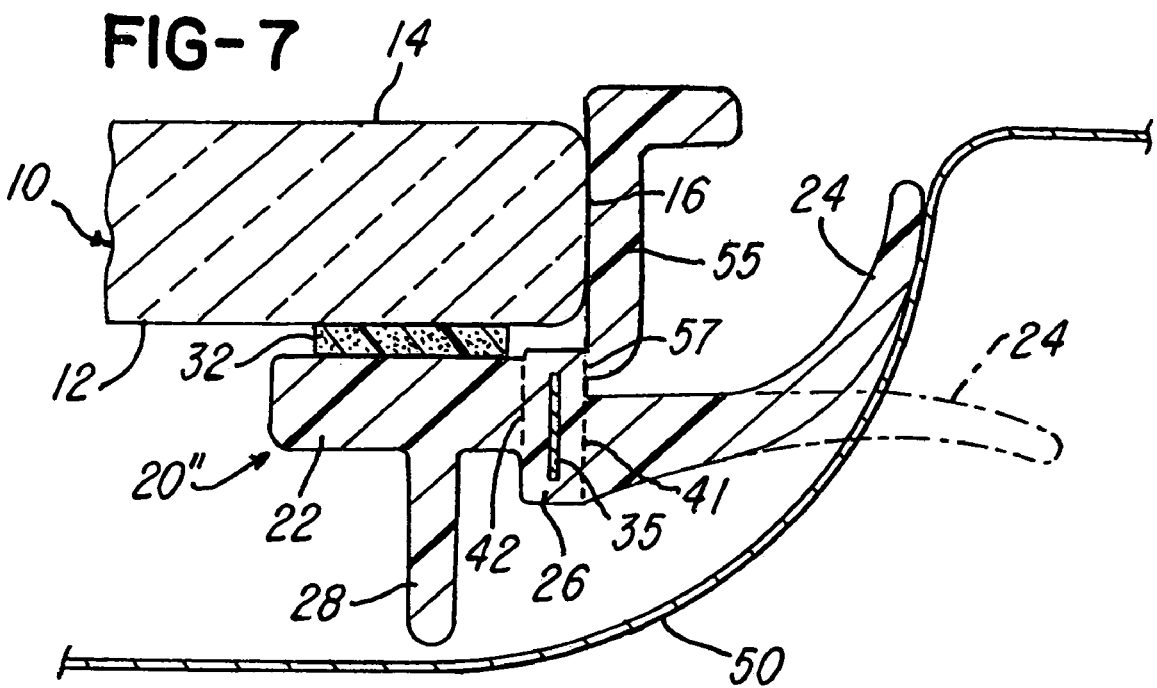

TRIM MOLDING FOR A MOTOR VEHICLE WINDOW PANEL

BACKGROUND OF THE INVENTION

This invention relates to an extruded elastomeric or plastic trim molding which extends around the peripheral edge portion of a glass window panel as used in a motor vehicle, and of the general type disclosed in U.S. Pat. Nos. 5,338,087, 6,279,983, 6,382,696 and 7,188,885 which issued to the assignee of the present invention. Sometimes, such moldings are placed in fixtures, for example, as disclosed in U.S. Pat. No. 5,603,546, so that the window panel may be lowered onto the molding while the fixture holds the molding according to the peripheral contour of the window panel. This form of attachment is commonly used by original equipment manufacturers of window panel assemblies which are delivered to motor vehicle assembly plants.

It is also sometimes desirable to attach the trim molding to the window panel in the field where a fixture is not available, for example, in the motor vehicle aftermarket. For this type of installation of a trim molding onto a window panel, a trim molding as disclosed in above-mentioned U.S. Pat. No. 7,188,885 is highly desirable in that a tear-off locating flange precisely locates the trim molding on the peripheral edge portion of the window panel, after which the locating flange is removed. In both types of assembly, with or without a fixture, it is desirable to use a pressure sensitive contact adhesive to attach the trim molding to the window panel in order to minimize the time required to complete the assembly of the trim molding onto the window panel. However, the contact adhesive requires that the trim molding be precisely located with respect to the window panel before the adhesive contacts the window panel.

It has also been found desirable to construct an elastomeric trim molding so that it may be quickly and efficiently attached to a window panel having corner portions with relatively small radii, for example, radii under two inches, and without significantly distorting the profile of the molding after it is attached. One method for producing a trim molding onto a glass window panel with rounded corners is disclosed in U.S. Pat. No. 5,316,829. In this patent, the trim molding is progressively extruded onto the peripheral edge portion of the window panel. However, this method requires complex extruding apparatus and substantial time to attach a trim molding.

SUMMARY OF THE INVENTION

The present invention is directed to an improved extruded trim molding of elastomeric plastics material and which may be quickly and efficiently attached to the peripheral edge portion of a window panel having corner portions with relatively small radii and without significantly distorting the cross-sectional configuration or profile of the trim molding. In accordance with one illustrated embodiment of the invention, a trim molding is extruded from an elastomeric plastics material and includes a mounting flange which carries a contact adhesive for quickly attaching the mounting flange to the peripheral edge portion of a window panel. The mounting flange is integrally connected to a flexible sealing flange by an intermediate connecting portion preferably having a durometer significantly higher than the durometer of the mounting flange and the durometer of the sealing flange.

The intermediate connecting portion is extruded with a continuous non-stretchable flexible stabilizing member which prevents stretching of the intermediate connecting portion and permits the trim molding to be formed around a small radius corner portion of the window panel when the more elastic softer sealing flange stretches and the softer mounting flange compresses. Preferably, the mounting flange and sealing flange and the intermediate connecting portion of the trim molding are all located inside of a plane defined by the inner surface of the window panel with the connecting portion flush with the edge surface of the window panel. The trim molding of the invention may be supported by a fixture for high volume assemblies at original equipment manufacturers or may be provided with a tear away locating flange which guides the trim molding onto the edge portion of the window panel without the use of a fixture, for lower volume production or use in the aftermarket.

Other features and advantages of the invention will be apparent from the following description, the accompanying drawings and the appended claims.

BRIEF DESCRIPTION OF THE DRAWINGS

FIG. 1 is an enlarged fragmentary perspective view of a trim molding constructed in accordance with the invention and attached to the peripheral edge portion of a window panel;

FIG. 2 is an enlarged end view of the extruded trim molding shown in FIG. 1 and with an attached contact adhesive tape;

FIG. 3 is a cross-section of the molding shown in FIG. 2 supported by a fixture and attached to a glass window panel;

FIG. 4 is a corner portion of a window panel with an attached trim molding as shown in FIGS. 1-3;

FIG. 5 is an enlarged end view of an extruded trim molding constructed in accordance with a modification of the invention;

FIG. 6 is an enlarged cross-section of the trim molding and window panel edge portion shown in FIG. 3 and installed on a sheet metal vehicle body; and FIG. 7 is an enlarged cross-section similar to FIG. 6 and showing an extruded trim molding formed in accordance with a modification of the invention.

DESCRIPTION OF THE ILLUSTRATED EMBODIMENTS

Referring to FIG. 1, a glass window panel 10 is shown greatly enlarged and, as commonly used on a motor vehicle, is generally rectangular with rounded corners. The window panel 10 has an inner surface 12 and a parallel outer surface 14 and a peripheral edge surface 16 which extends perpendicular or normal to the surfaces 12 and 14. The window panel 10 has a rounded corner portion 18 (FIG. 4) having a relatively small radius of curvature, for example, between one inch and two inches. While the window panel is shown as a glass window panel, the panel may be formed of a clear plastics material such as a polycarbonate.

In accordance with the present invention, a window trim molding 20 is extruded of an elastomeric plastics material, such as a polyvinylchloride, and includes a mounting flange 22 and a sealing flange 24 which are integrally connected by an intermediate connecting portion 26 which is integrally extruded with the flange portions 22 and 24. An optional standoff or spacer flange or rib 28 may also be integrally extruded as part of the flanges 22 and 24 and connecting portion 26 and projects inwardly from the mounting flange 22. The mounting flange 22 carries a heat bonded adhesive or a double sided pressure sensitive contact adhesive tape 32 which bonds the mounting flange 22 to the inner surface 12 of the window panel 10 around the peripheral edge portion of the panel.

As shown in FIG. 2, the intermediate connecting portion is extruded with a longitudinally extending and continuous stabilizing member 35, preferably in the form of a strip of metal or aluminum foil which is positioned normal to the mounting flange 22 and perpendicular to the inner surface 12 of the window panel 10. As shown, the intermediate connecting portion 26 has a generally rectangular cross-sectional configuration and surrounds the stabilizing member or strip 35 and with an outer edge surface 37 substantially flush with the outer edge surface 16 of the window panel 10.

The intermediate connecting portion 26 of the molding 20 is extruded with a higher durometer than the durometer of the flange portions 22 and 24. The dotted lines 41 and 42 shown in the drawings illustrate the transition zones between the different durometers. Preferably, the mounting flange 22 and sealing flange 24 have a durometer within the range of 50 A to 75 A, and the intermediate connecting portion 26 has a durometer within the range of 80 A to 50 D. This difference in durometers cooperates with the stabilizing member or strip 35 to provide for compression of the mounting flange 22 and stretching of the sealing flange 24 when the trim molding 20 is attached to the rounded corner portion 18 of the window panel 10.

Referring to FIG. 3, before the window panel 10 is attached to the trim molding 20 with the contact adhesive tape 32 carried by the mounting flange 22, the trim molding 20 may be placed within a mating cavity 44 of a frame-like metal fixture rail 45 which extends under the periphery of the window panel 10. The trim molding 20 is precisely positioned within the fixture rail 45, after which the window panel 10 is lowered, for example, by a vacuum suction head on a robot arm, until the inner surface 12 of the window panel engages or contacts the adhesive tape 32 which immediately bonds the trim molding 20 to the window panel 10. As best shown in FIG. 3, the mounting flange 22 and sealing flange 24 and the intermediate connecting portion 26 are located inwardly of a plane defined by the inner surface 12 of the window panel with the intermediate connecting portion 26 and the stabilizing member or strip 35 generally perpendicular to the window panel. The sealing flange 24 is tapered and curves slightly away from the plane of the inner surface 12 of the window panel 10. As illustrated in FIG. 4, when the trim molding is attached to the window panel 10, the sealing flange 24 stretches slightly and extends around the small radius of the corner portion 18 of the window panel 10 without significantly distorting the outwardly projecting and slight curvature of the sealing flange 24.

FIG. 5 illustrates a trim molding 20' which is constructed or extruded in the same manner as the trim molding 20 but without the standoff or spacer flange or rib 28. In some installations of an assembly of a window panel and attached trim molding, it is not necessary to have a standoff or spacer rib which is used, as shown in FIG. 6, to position the window panel 10 and attached trim molding 20 from a sheet metal section or portion 50 of a vehicle body. As also shown in FIG. 6, when the assembly of the window panel 10 and attached trim molding 20 is installed within a frame-like cavity of the vehicle body as defined by the sheet metal portion 50, the sealing flange 24 flexes and forms a fluid-tight seal between the trim molding 20 and the window panel 10 with the sheet metal portion 50 of the vehicle body.

Referring to FIG. 7, the trim molding 20 or 20' may be extruded with an integrally connected locating flange 55, forming a trim molding 20". The function and use of the locating flange 55 is the same as the function and use of the locating flange 24 disclosed in above-mentioned U.S. Pat. No. 7,188,885, the disclosure of which is herein incorporated by reference. The locating flange 55 is integrally extruded and connected to the portion 26 of the body of the trim molding 20" by a weakened tear zone 57 which is preferably formed in the same manner as disclosed in the '885 Patent. The trim molding 20" is ideally suited for attaching to a window panel in the field or aftermarket where a support fixture, such as the fixture 45, is not available for supporting the trim molding while the window panel is attached. That is, the locating flange 55 is used to position the trim molding precisely around the edge portion of the window panel by progressively sliding the locating flange 55 along the edge surface 16 of the window panel until the contact adhesive tape 32 engages or contacts the inner surface 12 of the window panel 10. The locating flange 55 may then be torn or pulled away from the body of the trim molding 20" either before the window assembly and attached trim molding are installed on the vehicle body or after the assembly is installed, as shown in FIG. 7.

From the drawings and the above description, it is apparent that a trim molding constructed and used in accordance with the invention, provides desirable features and advantages. For example, the trim molding may be quickly and efficiently attached to the peripheral edge portion of a window panel either by the use of a fixture 45 or a removable locating flange 55. In addition, the profile of the trim molding, the position of the stabilizing member 35 and the differential durometers enable the trim molding to be extended around window panel corner portions having relatively small radii and without significantly distorting the outwardly projecting sealing flange 24 from the position shown in FIGS. 2 and 5. As a result, the sealing flange 24 does not curl upwardly or downwardly when the molding extends around the corner portions 18 and thereby provides for a continuous and positive seal with the vehicle body portion 50 after the molding is installed. The trim molding may also be extruded with or without the spacer flange or rib 28 and with or without the removable locating flange 55.

While the forms of trim molding and their attachment to a window panel herein described constitute preferred embodiments of the invention, it is to be understood that the invention is not limited to these precise forms of moldings and attachments, and that changes may be made therein without departing from the scope and spirit of the invention as defined in the appended claims.

What is claimed is:

1. A trim molding in combination with a motor vehicle window panel having an inner surface and a parallel outer surface connected by a peripheral edge surface, said molding comprising an elongated extruded flexible body of plastics material and including a mounting flange connected to a sealing flange by an intermediate connecting portion with said mounting flange and said sealing flange projecting in opposite directions from said intermediate connecting portion, a layer of adhesive on said mounting flange and bonding said mounting flange to said inner surface of said window panel, said sealing flange projecting laterally outwardly from said intermediate connecting portion with said intermediate connecting portion having a substantially higher durometer than a durometer of said sealing flange and a durometer of said mounting flange, a non-stretchable and flexible metal stabilizing strip extending longitudinally within said intermediate connecting portion and disposed entirely inwardly from said inner surface of said window panel, said stabilizing strip having a substantially uniform thickness and a width substantially greater than its thickness and positioned within said intermediate connecting portion with said width of said strip perpendicular to said inner surface of said window panel, said body including said mounting flange, said intermediate connecting portion and said stabilizing strip disposed entirely inwardly of a plane defined by said inner surface of said window panel with said intermediate connecting portion and said metal stabilizing strip substantially aligned with said peripheral edge surface of said window panel, and said intermediate connecting portion with said higher durometer cooperating with said stabilizing strip to provide for longitudinal stretching of said sealing flange in response to curving said molding around a curved corner edge surface of said window panel without stretching said intermediate connecting portion and without substantially distorting said trim molding.

2. A trim molding as defined in claim 1 wherein said intermediate connecting portion has an outer edge surface substantially flush with said edge surface of said window panel.

3. A trim molding as defined in claim 2 and including a longitudinally extending locating flange projecting from said outer edge surface of said intermediate connecting portion and adapted to slide on said edge surface of said window panel in a direction perpendicular to said inner surface of said window panel for locating said trim molding on said window panel, and said outer edge surface of said intermediate connecting portion and said locating flange define therebetween a weakened tear zone to provide for quickly removing said locating flange after said layer of adhesive contacts said inner surface of said window panel.

4. A trim molding as defined in claim 1 wherein said intermediate connecting portion is substantially rectangular in cross-section and has an outer edge surface substantially flush with said edge surface of said window panel, and said stabilizing strip is disposed within a center portion of said intermediate connecting portion.

5. A trim molding as defined in claim 1 wherein said mounting flange and said sealing flange have substantially the same durometer.

* * * * *